United States Patent [19]

Teran et al.

[11] Patent Number: 6,039,874
[45] Date of Patent: Mar. 21, 2000

[54] APPARATUS AND METHOD FOR PURIFICATION OF AGRICULTURAL ANIMAL WASTE

[75] Inventors: Alfredo J. Teran, Cape Canaveral; John R. Derrick, Jr., Rockledge; Nidal A. Samad, Merritt Island; W. Todd Willoughby, Cape Canaveral; Richard G. Wood, Merrit Island, all of Fla.

[73] Assignee: AJT & Associates, Inc., Cape Canaveral, Fla.

[21] Appl. No.: 09/167,275

[22] Filed: Oct. 6, 1998

Related U.S. Application Data

[60] Provisional application No. 60/061,397, Oct. 7, 1997, provisional application No. 60/070,410, Jan. 5, 1998, provisional application No. 60/070,709, Jan. 7, 1998, and provisional application No. 60/079,360, Mar. 25, 1998.

[51] Int. Cl.⁷ .................................................... C02F 3/30
[52] U.S. Cl. ......................... 210/605; 210/609; 210/622; 210/195.1; 210/202; 210/903
[58] Field of Search ..................... 210/605, 609, 210/621, 622, 630, 194, 195.1, 196, 202, 259, 903

[56] References Cited

U.S. PATENT DOCUMENTS

| | | | |
|---|---|---|---|
| 3,429,806 | 2/1969 | Carter et al. | 210/621 |
| 3,701,727 | 10/1972 | Kormanik | 210/605 |
| 3,966,450 | 6/1976 | O'Neill et al. | 71/15 |
| 4,029,545 | 6/1977 | Bykowski et al. | 210/605 |
| 4,045,522 | 8/1977 | Nafziger | 261/93 |
| 4,137,158 | 1/1979 | Ishida et al. | 210/16 |
| 4,177,575 | 12/1979 | Brooks | 34/13 |
| 4,183,807 | 1/1980 | Yoshizawa et al. | 210/2 |
| 4,220,723 | 9/1980 | Eckmayer et al. | 435/265 |
| 4,338,337 | 7/1982 | Frankl | 210/622 |
| 4,348,285 | 9/1982 | Groeneweg et al. | 210/602 |
| 4,432,869 | 2/1984 | Groeneweg et al. | 210/602 |
| 4,592,275 | 6/1986 | Frankl | 99/495 |
| 4,721,569 | 1/1988 | Northrop | 210/607 |
| 4,772,307 | 9/1988 | Kiss et al. | 71/13 |
| 4,824,563 | 4/1989 | Iwahori et al. | 210/605 |
| 5,062,387 | 11/1991 | Anderson | 119/28 |
| 5,078,882 | 1/1992 | Northrop | 210/602 |
| 5,135,659 | 8/1992 | Wartanessian | 210/666 |
| 5,200,082 | 4/1993 | Olsen et al. | 210/667 |
| 5,282,879 | 2/1994 | Baccarani | 71/10 |
| 5,470,476 | 11/1995 | Taboga | 210/615 |
| 5,472,472 | 12/1995 | Northrop | 71/9 |
| 5,525,239 | 6/1996 | Duske | 210/739 |
| 5,538,529 | 7/1996 | Northrop | 71/9 |
| 5,545,325 | 8/1996 | Usu et al. | 210/605 |
| 5,545,560 | 8/1996 | Chang | 435/290 |
| 5,622,630 | 4/1997 | Romano | 210/683 |
| 5,626,644 | 5/1997 | Northrop | 71/9 |
| 5,627,069 | 5/1997 | Powlen | 435/267 |

OTHER PUBLICATIONS

Stith, Pat and Warrick, Joby, "Boss Hog: North Carolina's pork revolution", The News & Observer, Feb. 19–26, 1995, pp. 1–3.

Stith, Pat and Warrick, Joby, "New studies show that lagoons are leaking", The News & Observer, Feb. 19, 1995, pp. 1–8.

Stith, Pat and Warrick, Joby, "Lacking staff, DEM finds it hard to challenge status quo", The News & Observer, Feb. 19, 1995, pp. 1–3.

Stith, Pat and Warrick, Joby, "Law restricts hog information, even from N.C. officials", The News & Observer, Feb. 19, 1995, pp. 1–3.

Stith, Pat and Warrick, Joby, "Corporated takeovers", The News & Observer, Feb. 21, 1995, pp. 1–6.

Stith, Pat and Warrick, Joby, "For Murphy, good government means good business", The News & Observer, Feb. 22, 1995, pp. 1–6.

Stith, Pat and Warrick, Joby, "The smell of money", The News & Observer, Feb. 25, 1995, pp. 1–5.

Stith, Pat and Warrick, Joby, "Who's in charge?", The News & Observer, Feb. 26, 1995, pp. 1–6.

Stith, Pat and Warrick, Joby, "Boss Hog: Information Sources", The News & Observer, pp. 1–6.

"Policy Recommendations for Management of Agricultural Animal Waste in North Carolina", Report of the Agricultural Animal Waste Task Force, Nicholas School of the Environment, Apr. 1996, pp. 1–2.

"Pork Powerhouses 1996", Successful Farming, SF Pork Powerhouses Oct. 1996, pp. 1–5.

Seth Effron, Editor, "You Don't Say", The Insider, Jun. 3, 1996, vol. 4, No. 108, (5 pages.).

Knight, Bill, "Megafarms", Apr. 17, 1997, pp. 1–2.
Stith, Pat and Warrick, Joby, "Midwest farmers fear N.C.–style expansion", The News & Observer, Feb. 21, 1995, pp. 1–6.
Associated Press "Siegrist expects special session", The Iowa Legislative Report, Apr. 19, 1997, pp. 1–2.
Sullivan, Ken, "Debate over hog farm issues", The Iowa Legislative Report, Apr. 24, 1997, pp. 1.
Boshart, Rod, "Hot lot issues linger", The Iowa Legislative Report, May 1, 1997, pp. 1–2.
"Agriculture: Successful Farming", Pork Powerhouses, pp. 1.
Levine, Adam, "Overwhelming Majority Passes Hog Farm Bill", Missouri Digital News, May 16, 1996, pp. 1.
Boshart, Rod, "2 ag issues left hanging", The Iowa Legislative Report, April 30, 1997, pp. 1–2.
"Welcome to Circle Four Farms", Circle 4 Farms (5 pages).
"C.O.W. spells success for Murphy Family Farms", Jan. 18, 1997, pp. 1.
Wagner, John, "Hayes issues aggressive plan for addressing hog–farm problems", The News & Observer, Feb. 16, 1995, pp. 1–2.
General Assembly of North Carolina, Session 1997, House Bill 85, "Environmentally Sound Policy Act", Feb. 10, 1997, pp. 1–7.
General Assembly of North Carolina, Session 1997, House Bill 307, "Environmentally Sound Policy Act", Feb. 24, 1997, pp. 1–7.
General Assembly of North Carolina, Session 1997, House Bill 515, "Environmentally Sound Policy Act", March 13, 1997, pp. 1–8.
General Assembly of North Carolina, Session 1997, House Bill 238, "Facilitate Animal Waste Mgt. Research", Feb. 17, 1997, pp. 1–2.
General Assembly of North Carolina, Session 1997, House Bill 357, "General Animal Waste Permits", Feb. 27, 1997, pp. 1–2.
General Assembly of North Carolina, Session 1997, Senate Bill 478, "Amend Swine Farm Laws", Mar. 25, 1997, pp. 1–6.
General Assembly of North Carolina, Session 1997, House Bill 944, "Zoning/Siting Swine Farms", Apr. 15, 1997, pp. 1–4.
General Assembly of North Carolina, Session 1997, House Bill 974, "Improve Animal Waste Management", Apr. 16, 1997, pp. 1–4.
General Assembly of North Carolina, Session 1997, Senate Bill 1043, "Comprehensive Water Quality Management", Apr. 21, 1997, pp. 1–5.
Neff, Joseph and Leavenworth, Stuart, "Builders big losers in moratorium", The News & Observer, Apr. 9, 1997, pp. 1–3.
Editorial: The best hog plan, The News & Observer, Apr. 9, 1997, pp. 1–2.
Wagner, John, "Hunt to back hog ban", The News & Observer, Apr. 8, 1997, pp. 1–3.
Patterson, Dennis, "Farmers gather at legislature to protest new hog regulations", The News & Observer, Mar. 27, 1997, pp. 1–2.
Rawlins, Wade, "Tension growing over hog rules", The News & Observer, Apr. 3, 1997, pp. 1–3.
Editorial: Eye on the hog plan, The News & Observer, Apr. 16, 1997, pp. 1–2.
Neff, Joseph, "Effort to curb hogs stays alive in House committee", The News & Observer, Mar. 20, 1997, pp. 1–3.

Neff, Joseph, "House leaders seek new hog–farm curbs", The News & Observer, Mar. 13, 1997, pp. 1–2.
Leavenworth, Stuart, "Hog farm debate draws crowd to legislature", The News & Observer, Mar. 6, 1997, pp. 1–3.
Allgood, Jerry, "Craven halts hog farm permits for year", The News & Observer, Feb. 26, 1997, pp. 1–2.
Neff, Joseph, "Hog debate focuses on zoning", The News & Observer, Apr. 15, 1997, pp. 1–3.
Neff, Joseph, "House passes curbs on hog farms", The News & Observer, Apr. 30, 1997, pp. 1–3.
Heath, Jena, "Copies of report on suggested hog–farm laws are getting scarce", The News & Observer, May 27, 1997, pp. 1.
"Dome: governor waffles on hog curbs", The News & Observer, Apr. 2, 1997, pp. 1–2.
Associated Press, "Activists push for strict rules on livestock farms", The News & Observer, May 17, 1996, pp. 1–2.
Editorial: Senate menu: pork, The News & Observer, May 2, 1997, pp. 1–2.
Letter: Rogers' quaint delusions about N.C. farming, The News & Observer, Apr. 26, 1997, pp. 1–2.
Neff, Joseph, "Once mired in committee, a hog bill takes wings", The News & Observer, Mar. 21, 1997, pp. 1–3.
General Assembly of North Carolina, Session 1995, Senate Bill 695, "Agriculture Waste Commission", Apr. 13, 1995, pp. 1–3.
General Assembly of North Carolina, Session 1995, Senate Bill 1345, "Animal Waste Permits/Inspections", May 27, 1996, pp. 1–5.
General Assembly of North Carolina, Session 1995, House Bill 524, "Agriculture Waste Commission", Mar. 22, 1995, pp. 1–3.
General Assembly of North Carolina, Session 1995, House Bill 1293, "Bladen CC Swine Funds", May 22, 1996, pp. 1.
"A short history of hogs in North Carolina", The News & Observer, Apr. 15, 1997, pp. 1.
Seth Effron, Editor, "You Don't Say", The Insider, May 27, 1996, vol. 4, No. 103, (5 pages).
Rose, James, "Irked Valentine wants hog panel to get to work", The News & Observer, Jan. 19, 1996, pp. 1–3.

*Primary Examiner*—Christopher Upton
*Attorney, Agent, or Firm*—Stein, Schifino & Van Der Wall

[57] ABSTRACT

An apparatus and method for treating and reusing the wastewater discharged from agricultural animal farms. The apparatus and method of the present invention is designed to be a zero discharge system in which no wastewater will be discharged or spray irrigated. The wastewater effluent is first passed through a mechanical screen were bulk solids are separated and partially de-watered. The screened effluent is then directed to a primary plastic-lined earthen lagoon where it undergoes aerobic digestion utilizing specially selected bacteria. After treatment in the primary lagoon, the wastewater effluent is used to wash the floors of the hog houses or undergoes a purification phase including solids separation/denitrification, filtration and sterilization. The solids separation/denitrification phase (clarification) preferably takes place in an anoxic environment in preferably above-ground tanks where suspended solids removal will occur as well as denitrification for nitrate reduction. The clarification process may be facilitated through use of polymer addition. The majority of solids will be sent to a plurality of drying beds for de-watering and subsequent removal.

8 Claims, 6 Drawing Sheets

APPARATUS AND METHOD FOR PURIFICATION OF AGRICULTURAL ANIMAL WASTE

CROSS-REFERENCE TO RELATED APPLICATIONS

This application claims the benefit of U.S. Provisional Application No. 60/061,397, filed on Oct. 7, 1997; U.S. Provisional Application No. 60/070,410 filed on Jan. 5, 1998; U.S. Provisional Application No. 60/070,709 filed on Jan. 7, 1998 and U.S. Provisional Application No. 60/079,360 filed Mar. 25, 1998. The disclosures of the provisional applications are incorporated herein by reference.

BACKGROUND OF THE INVENTION

1. Field of the Invention

The present invention relates to an apparatus and method for the purification of agricultural animal waste and, more particularly, to a system for treatment of manure and wastewater and the reuse of wastewater produced and as a byproduct of agricultural facilities.

2. Description of the Background Art

Over the past decades there has been a shift from smaller localized family farms toward larger integrated confinement agricultural operations. Specifically, large agricultural operations may utilize confinement barns to house a large number of livestock such as swine, poultry or dairy cows. Using the swine industry as an example, often numerous hog-confinement operations are grouped in close proximity forming "mega-farms" which may house tens of thousands of hogs. While these larger agricultural operations have numerous advantages, attendant with these larger facilities are pollution problems relating to the handling and treatment of manure and wastewater (hereinafter collectively "wastewater"). By way of example, pollution problems associated with liquid animal waste, such as produced by the swine industry, include nitrogen, phosphorus, solids, bacteria and foul odors that result from anaerobic digestion. Environmental concerns more specifically center on odor and water quality issues.

Currently, most agricultural facilities use anaerobic digestion for treatment of animal wastes and wastewater. The primary reasons for using anaerobic digestion is simplicity and cost. Wastewater is simply discharged from the animal storage facility into an open lagoon or plurality of lagoons (ponds used to store and treat thousands to millions of gallons of animal waste) where the waste undergoes natural anaerobic digestion. However, over forth (40) noxious gases may be emitted from anaerobic lagoons at hog farms including ammonia, methane and hydrogen sulfide. Additionally, the time required for complete digestion of the organic wastes is relatively long, from weeks to months. Some current regulations require a residence time of 180 days for animal waste facilities using anaerobic lagoons for digestion. Neighbors find odors emanating from lagoons, confinement houses, and fields onto which wastes are sprayed to be a nuisance. In fact, as a result of odor problems associated with anerobic lagoons, certain states have legally mandated buffer zones or designated land areas between lagoon sites and populated areas.

New studies have shown that lagoons are leaking and there have been pollution problems with the groundwater, rivers, lakes and coastal waters primarily in states where the high concentrations of hog farms are located. Another problem attendant with traditional anerobic settling lagoons is that occasionally the water overflows the lagoons or the earthen containment berms collapse, primarily during periods of heavy rainfall, and the wastewater runs-off into streams, rivers and lakes causing severe pollution problems. When wastewater escapes from these lagoons either resulting from overflows or other failures, the high concentrations of pollutants has adverse effects on the receiving waters and commonly results in groundwater contamination and massive fish and other aquatic life kills.

The most critical problem in the recent past has been with the microorganism *Pfiesteria piscicida*. *Pfiesteria piscicida* is a dinoflagellate related to the species of dinoflagellates that cause "red tides". This bacterium has the ability to take on up to twenty four (24) different forms during its life cycle and can attack and kill fish within hours. Recent outbreaks of *Pfiesteria piscicida* could be attributed to the increase in nutrients in the water or to the weakening of the fish due to stress caused by lack of oxygen and/or elevated ammonium levels among other factors.

Hog anerobic lagoon liquid effluent has nutrient characteristic including high levels of biochemical oxygen demand ($BOD_5$), Total Nitrogen (TN) and Phosphorus that cannot be decreased to acceptable levels by anerobic treatment alone. Even with bacterial digestion, significant amounts of sludge accumulate in an anerobic lagoon. Anerobic lagoons may fill to capacity fairly quickly which displaces the designed retention capacity of the lagoon fairly quickly and often serve to provide only partial pretreatment. Often, anaerobic settling lagoons serve to separate solids and reduce or decompose wastes enough to land spread or spray the waste on irrigation fields.

Hogs produce two or four times as much waste, per hog, as the average human and in North Carolina alone hogs produce about 9.5 million tons of manure a year. Therefore, a great deal of land is required for spreading the highly concentrated waste since often no discharge is permitted from animal waste facilities. Farmers who specialize in raising large quantities of animals are forced by regulations to use larger and larger areas of land in which to spread the large quantities of wastes generated from higher numbers of animals. This has, and will continue, a trend toward having to sacrifice more land to simply dispose of the waste. The land utilized for land spreading of waste cannot be just any land and must be carefully selected or altered so as to prevent any rainfall runoff discharging into any surface waters. The land must be planted with species capable of tolerating high nitrogen and high phosphorus containing wastes. The hog industry is running out of places to spread or spray the waste from lagoons.

At least one state has contemplated a moratorium on new facility construction until such time as a solution can be devised to resolve agricultural wastewater treatment issues. Additionally, in North Carolina, owners of existing agricultural waste management systems which were constructed prior to Dec. 31, 1993, must register with the state and have their animal waste management plan certified by a technical specialist.

Continuing efforts are being made to improve agricultural and animal waste treatment methods and apparatus. By way of example, note U.S. Pat. No. 5,472,472 to Northrop and U.S. Pat. No. 5,078,882 to Northrop. U.S. Pat. No. 5,472,472, discloses a process for the transformation of animal waste wherein solids are precipitated in a solids reactor, the treated slurry is passed to a bioreactor zone where soluble phosphorus is precipitated with metallic salts, the slurry is aerobically and anaerobically treated to form an active biomass. The aqueous slurry containing bioconverted phosphorus is passed into a polishing ecoreactor zone wherein at least a portion of the slurry is converted to a beneficial humus material. In operation, the system requires numerous chemical feeds and a series of wetland cells comprising microorganisms, animals and plants. See also U.S. Pat. Nos. 4,348,285 and 4,432,869 to Groeneweg et al.; U.S. Pat. No. 5,627,069 to Powlen; U.S. Pat. Nos. 5,135,659 to Wartanessian and 5,200,082 to Olsen et al. (relating to pesticide residues); U.S. Pat. No. 5,470,476 to Taboga and U.S. Pat. No. 5,545,560 to Chang.

Another grouping of background patents are those which disclose methods of treating wastewater rich in nutrients. Note U.S. Pat. No. 626,644 to Northrop; U.S. Pat. No. 4,721,569 to Northrop; U.S. Pat. No. 4,183,807 to Yoshizawa et al.

Another grouping of background patents are those which disclose methods of producing humus material or spreadable fertilizer from animal waste. By way of example see U.S. Pat. No. 5,538,529 to Northrop; U.S. Pat. No. 5,525,239 to Duske and U.S. Pat. No. 5,282,879 to Baccarani.

The disclosures of the documents submitted as part of the Information Disclosure Statement filed concurrently herewith are incorporated by reference in their entirety.

Not withstanding the existence of such prior art treatment systems, it remains clear there is a need for a wastewater treatment system that reduces the retention time of waste in an open lagoon, is a "closed-loop" system with no land spreading of waste and recycles and reuses water for use by agricultural animals.

Efforts to improve the methods and apparatus to reduce the deleterious effects of wastewater byproducts from agriculture continue. Accordingly, it is an object of the invention to provide an improvement that overcomes inadequacies of the prior art method and apparatus and provides an improvement, which is a significant contribution to the advancement of the art.

Another object of this invention is to provide a new and improved system for purification of agricultural animal waste which has all the advantages and none of the disadvantages of the prior art.

A further object of the present invention is to provide a system to treat manure and wastewater having a minimal impact on the environment.

Another object of the invention is to provide an apparatus and method of treating agricultural wastewater whereby no land spread irrigation is required.

Another object of the invention is to provide an effective treatment of the wastewater using methods that will greatly reduce if not eliminate the foul odors associated with anaerobic lagoons and providing a closed loop treatment process.

Another object of the invention is to treat wastewater without greatly reducing the fertilizer nutrients present in any recovered sludge.

Another object of the invention is the creation of an efficient, impervious aerobic lagoon that does not consume a large surface area and that does not pose an impact to groundwater.

Another object of the invention is to provide drinking water suitable for agricultural livestock through use of ozone purification of treated wastewater.

Another object of the invention is to provide a system for the purification of agricultural wastewater that is economically feasible.

The foregoing has outlined some of the pertinent objects of the invention. These objects should be construed to merely be illustrative of some of the more prominent features and applications of the intended invention. Many other beneficial results can be obtained by applying the disclosed invention in a different manner or by modifying the invention within the scope of the disclosure. Accordingly, other objects and a fuller understanding of the invention and the detailed description of the preferred embodiment in addition to the scope of the invention defined by the claims taken in conjunction with the accompanying drawings.

SUMMARY OF THE INVENTION

For the purposes of summarizing the invention, the present invention is drawn to a unique apparatus and method for treating and reusing the wastewater discharged from agricultural animal farms. The apparatus and method of the present invention is designed to be a zero discharge system in which no wastewater will be discharged or spray irrigated. In use the apparatus and method of the present invention will actually require addition of make-up water during periods of low rainfall to make-up water losses due to evaporation and drift. It is contemplated that the only byproduct of the apparatus and method may be a beneficial sludge if a sufficient number of installations are operated.

The apparatus and treatment method of the present invention will consist of several phases following delivery of the wastewater effluent from the agricultural sites. The wastewater effluent is first passed through a mechanical screen were bulk solids (in the case of hog farm wastewater this will consist primarily of corn) are separated and partially de-watered. The screened effluent is then directed to a primary plastic-lined earthen lagoon where it undergoes aerobic digestion utilizing specially selected bacteria. Treatment in the lagoon serves to break down organics and oxidize both macro- and micro-nutrients resulting in the reduction of $BOD_5$, COD, TKN, and ammonium-nitrogen. After treatment in the primary lagoon, the wastewater effluent is used to wash the floors of the hog houses or undergoes a purification phase including solids separation/denitrification, filtration and sterilization.

Periodic flushing of the sub-floor space beneath the hog pens in the animal houses serves to carry fresh waste to the treatment system. By using aerobically treated wastewater from the aerobic treatment lagoon, the sub-floor space is thereby incorporated into the treatment system. Aerobically treated wastewater carries with it the beneficial bacteria to begin the digestion of organics beneath the floor of the animal houses without the presence or generation of noxious gases which is a problem associated with flushing with anaerobic lagoon water. This will help to reduce health risks not only with the noxious gases but also with pathogenic bacteria associated with the anaerobic waste.

The solids separation/denitrification phase (clarification) preferably takes place in an anoxic environment in preferably above-ground tanks were suspended solids removal will occur as well as denitrification for nitrate reduction. The clarification process may be facilitated through use of polymer addition. The majority of solids will be sent to a plurality of drying beds for de-watering and subsequent removal, including but not limited to recycling through the aerobic lagoon for further treatment. The aerobically digested sludge will remain on the plurality of drying beds for a short period of time, to reduce water content, and since it is an aerobic not anaerobic sludge, odor should be greatly reduced or eliminated.

The final phase of treatment consists of reusing the treated wastewater. Wastewater having gone through solids separation/denitrification undergoes filtration and disinfection using ozone to provide drinking and misting water to the animals. Ozone will provide further oxidation of organics and disinfection of the wastewater resulting in drinking water suitable for animal consumption and/or misting water to cool the animals during warm temperatures. The present invention requires no land spreading of agricultural animal waste and drastically improves the quality of recycled water.

The foregoing has outlined rather broadly the more pertinent and important features of the present invention. The detailed description of the invention that follows is offered so that the present contribution to the art can be more fully appreciated. Additional features of the invention will be described hereinafter which form the subject of the claims of the invention. It should be appreciated by those skilled in the art that the conception and the disclosed specific embodiment may be readily utilized as a basis for modifying or designing other structures for carrying out the same purposes of the present invention. It should also be realized by those skilled in the art that such equivalent construction does not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION

Figure 1:
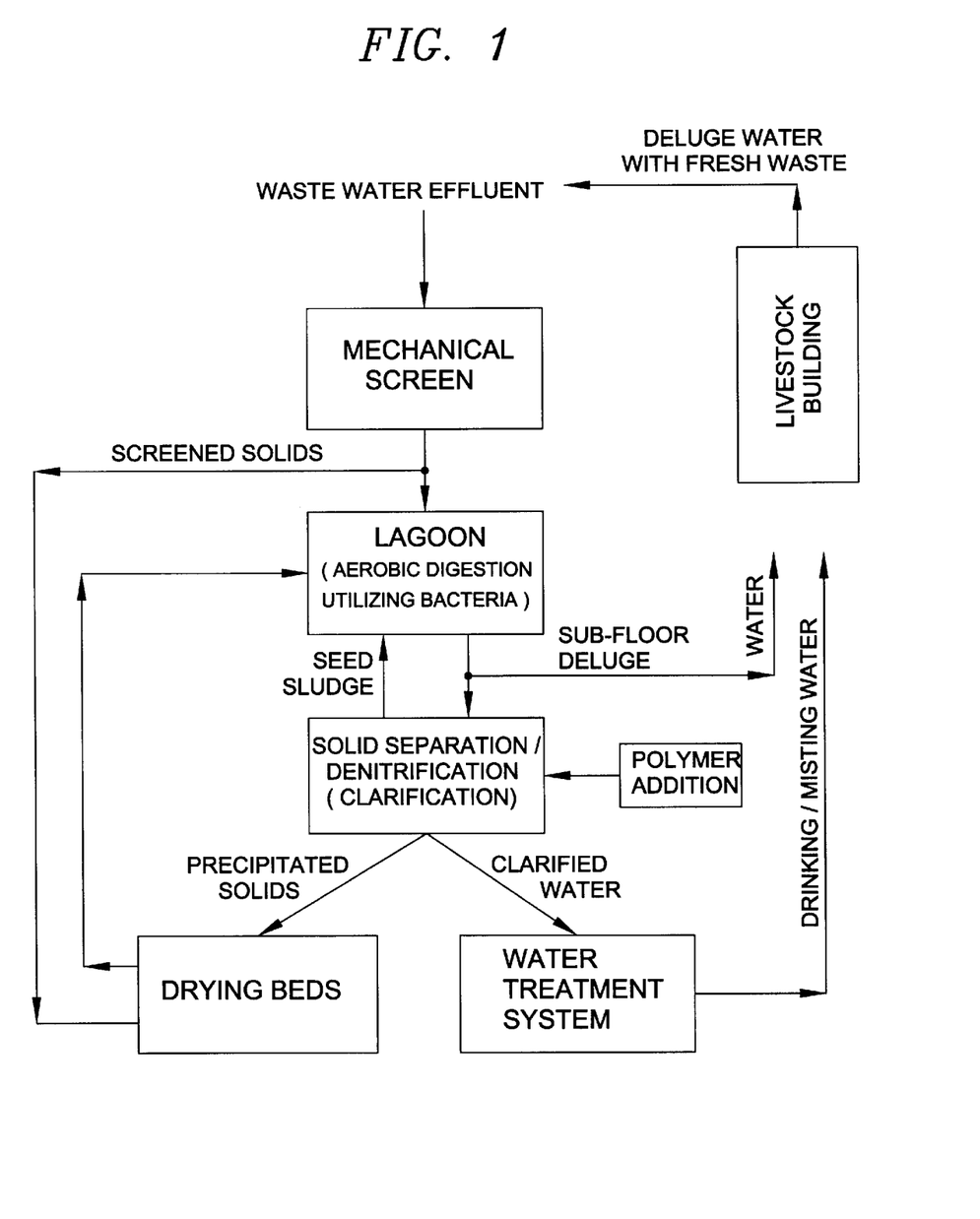
FIG. 1 is a flow diagram illustrating a preferred embodiment of the present invention.
Figure 2:
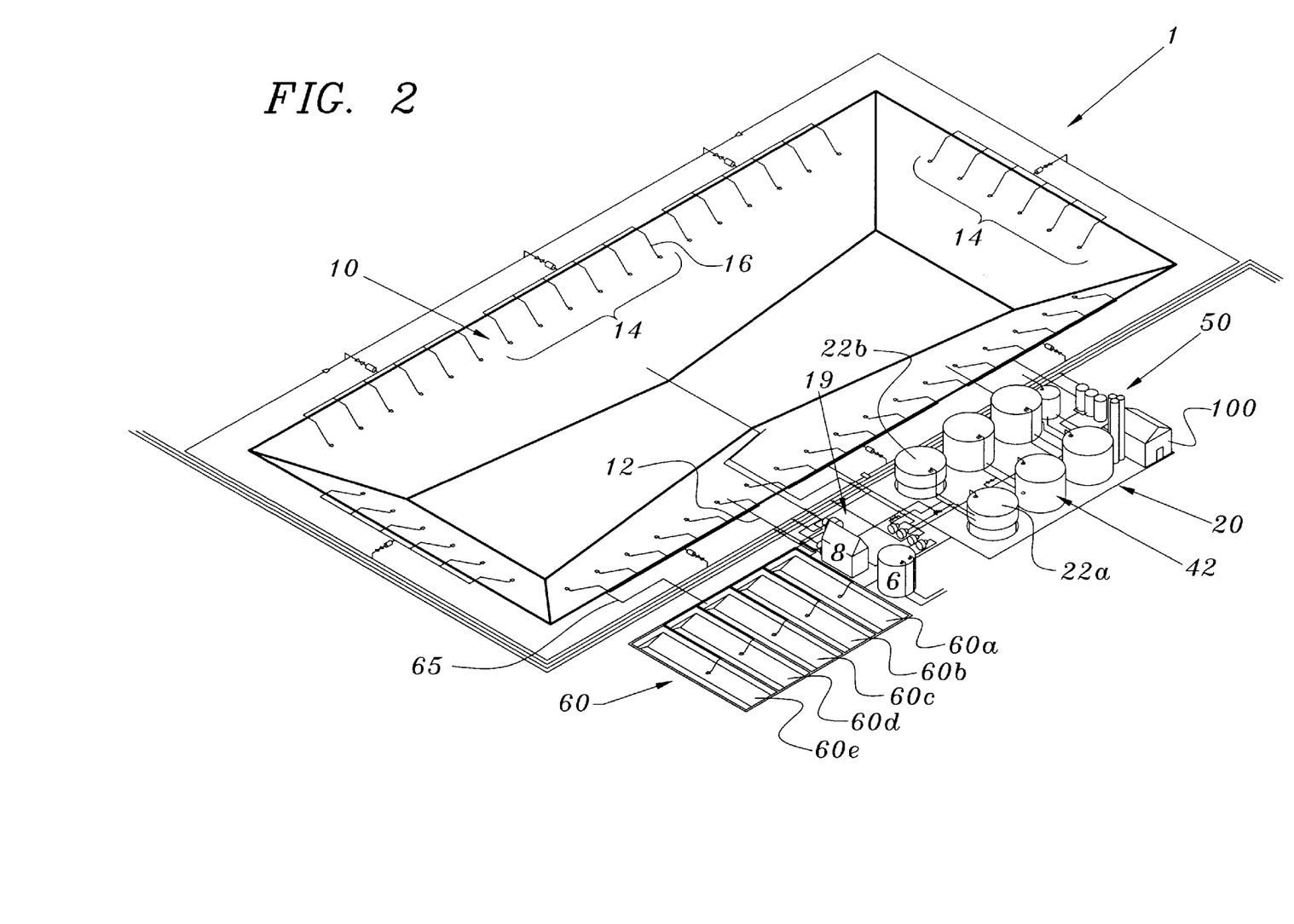
FIG. 2 is a perspective view of a preferred embodiment of the purification system of the present invention.

With reference to the drawings, and in particular FIGS. 1 and 2 thereof, a new and improved animal waste treatment system embodying the principles and concepts of the present invention and generally designated by the reference number 1 will be described.

Each agricultural operation where livestock such as swine are produced and housed will have different wastewater parameters and water requirements. System design and sizing will depend upon the wastewater effluent flow and $BOD_5$ input. These values will be dependent upon the type of farm, hog (sow, nursery or finishing), cattle or chicken and the number of animals per farm. By way of background, a swine operation may have several types of farms including sow, nursery and finishing farms. A sow farm would include breeding animals along with their offspring. Generally, a sow has an average weight of ~430 lbs. generates roughly ten gallons of wastewater per day per sow for a $BOD_5$ input of 0.42 lbs./sow/day (extrapolated value based upon $BOD_5$ input of 0.27 lbs./day for 275 pound sow). A nursery farm houses nursery pigs at an average weight of thirty to fifty pounds. Nursery pigs generate roughly two gallons of wastewater per day per hog for a $BOD_5$ input of 0.11 lbs./hog/day. A finishing hog generates approximately four gallons of wastewater per day per hog for a $BOD_5$ input of 0.47 lbs./hog/day. A typical hog diet would consist of corn/soybean feed and necessary mineral supplements.

Agricultural operations where livestock such as swine are produced and housed are water intensive. The apparatus illustrated in FIGS. 2–4 embodying the principles and concepts of the present invention is sized and dimensioned to handle the agricultural waste stream from a finishing farm containing eight (8) hog houses with approximately 1225 hogs per house for a total of approximately 9800 hogs. Each finishing hog generates an average of ~3.5 gal/day of wastewater with a $BOD_5$ input of 0.47 lbs/day per hog. This translates to a total wastewater generation of ~34,240 gallons per day and a total $BOD_5$ loading of ~4,600 pounds per day. Additionally, each finishing hog requires ~3.5 gallons/day water for drinking and/or misting. Misting requires $\leq 1.0$ gallon/day/hog during daylight hours in warm weather.

Generally, hog houses have under floor flushing from a water source (typically recycled wastewater from a treatment lagoon) for waste removal. Typically, deluge water is stored in 650 to 850 gallon tanks with flushing occurring on a set schedule. Therefore, assuming that flushing for waste removal occurs every sixty-five minutes during daylight hours the amount of water utilized for daily waste removal flushing is ~66,000 gallons per day. Therefore, total daily wastewater production is ~35,000 gallons waste/day plus ~66,000 gallons flush/day.

The primary pollutant problems associated with hog farms include nitrogen, solids, bacteria and the foul odors produced by anaerobic digestion (ammonia, hydrogen sulfide, methane, etc.). A "typical" hog anaerobic lagoon liquid effluent from this size agricultural operation may have the nutrient characteristics as listed in the following table:

| Parameter | Hog Lagoon Effluent (mg/L) | Raw Municipal Sewage (mg/L) |
| --- | --- | --- |
| $BOD_5$ | 691 | 220 |
| Total Kjeldahl Nitrogen (TKN) | 563 | 30 |
| Phosphorus | 225 | 8 |

The present invention is based upon a multiphase approach including aerobic treatment in an aerobic lagoon with mechanical aeration, solid separation and denitrification in an anoxic environment and disinfection of water through use of ozone. It is well within the skill of one in the art to vary the size of individual components and retention times based upon the parameters and amount of the agricultural wastewater.

Figure 3:
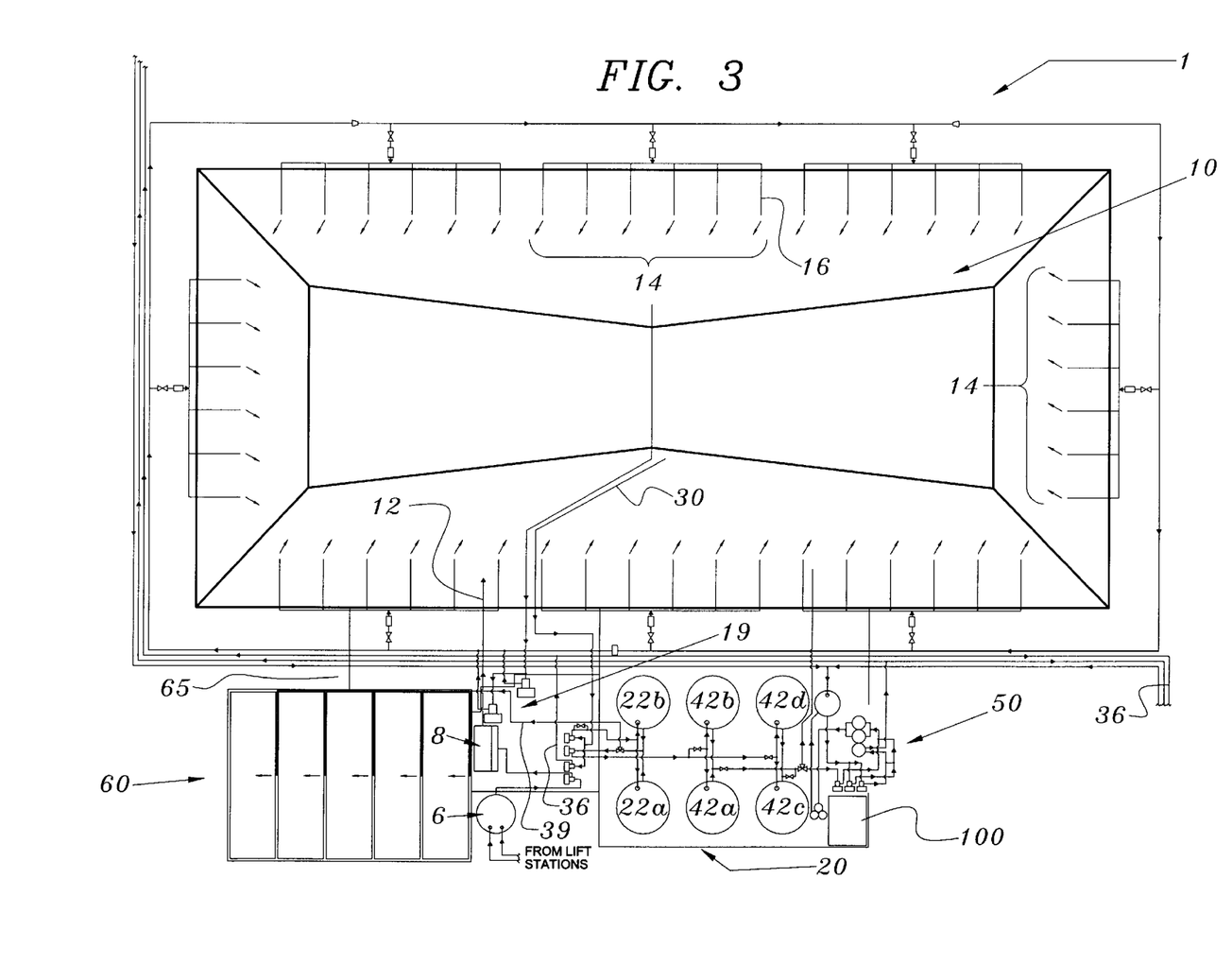
FIG. 3 is a top view and flow diagram of the purification system of the present invention.
Figure 4:
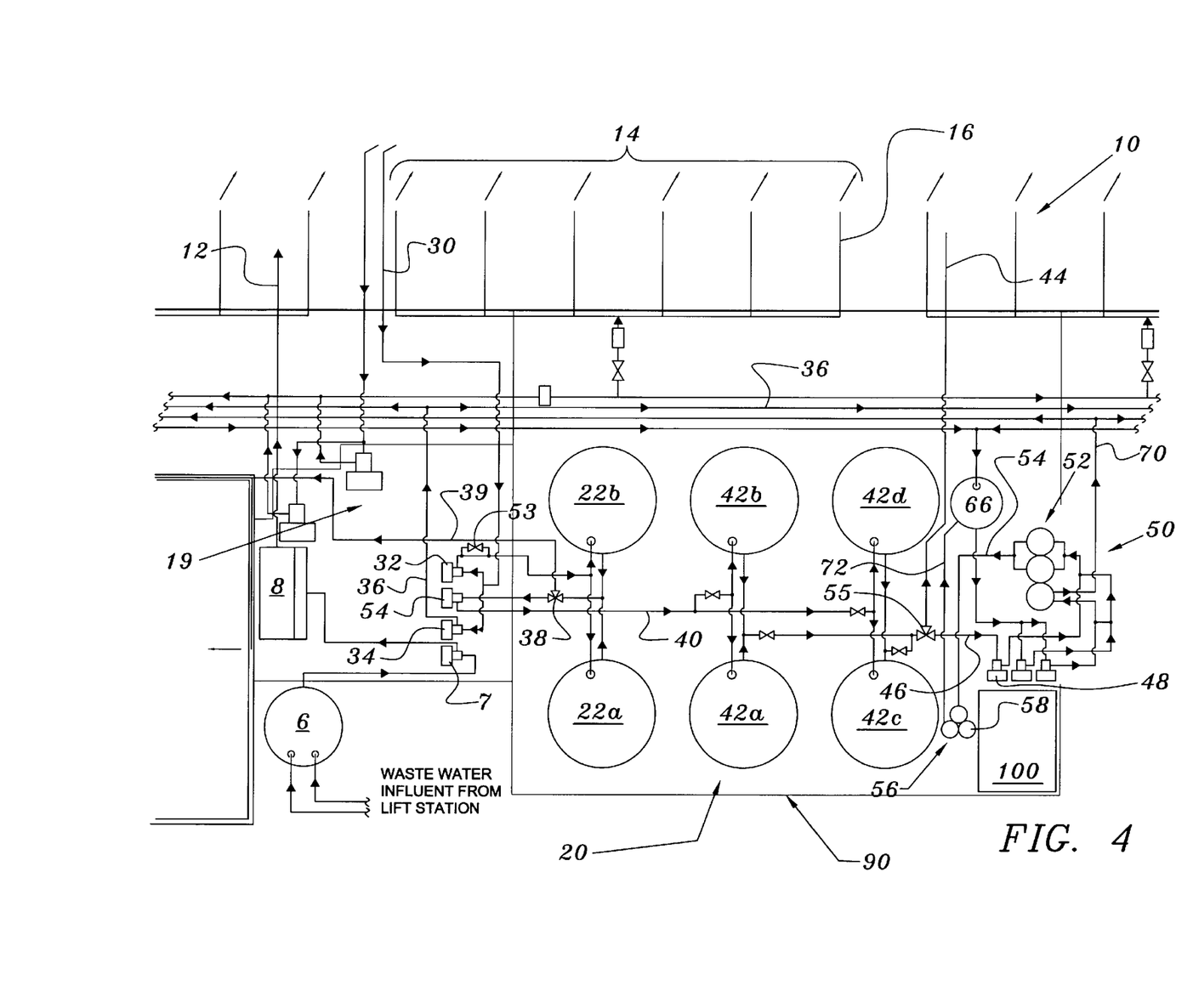
FIG. 4 is a detailed representation of the solid separation/denitrification phase and purification system of the present invention.

FIGS. 2–4 illustrate new installation/constructions in which a custom apparatus and system is designed for a specific agricultural operation. However, based upon the teachings of the present invention it is within the skill of one in the art to retrofitting existing agricultural facilities with equipment for treating the wastes modifying existing piping and lagoons to accomplish the proposed treatment scheme.

The wastewater purification system 1 of the present invention comprises an aerobic lagoon 10 wherein the primary treatment occurs based upon a combined organic oxidation/nitrification process. The main advantage of aerobic lagoons is that bacterial digestion tends to be more complete and occurs more rapidly than in an anaerobic lagoon.

As illustrated in FIGS. 1 and 3, wastewater influent collected from each animal retention area or penning area will be directed to a mechanically aerated lagoon via gravity or at least one lift station/grit station (not shown). As illustrated in FIG. 4, prior to introduction into the aerobic lagoon 10, a pump 7 draws wastewater from a surge tank 6 where the wastewater is deposited via gravity and/or lift stations through a mechanical screen 8. Any commercially available water pump such as those sold by Jacuzzi® and Myers® may be utilized in the present application. The mechanical screen removes bulks solids (primarily corn). Preferably, removed bulk solids are transferred to one of a plurality of drying beds 60. Once screened, the wet solids then pass through a mechanical roll press (not shown) for significant moisture reduction. The liquid waste simply passes through the mechanical screen and is directed to the aerobic lagoon. The benefit of mechanically screening the wastewater prior to introduction into the aerobic lagoon is that preventing the bulk solids from being introduced into the lagoon significantly reduces oxygen demand on the system.

Figure 7:
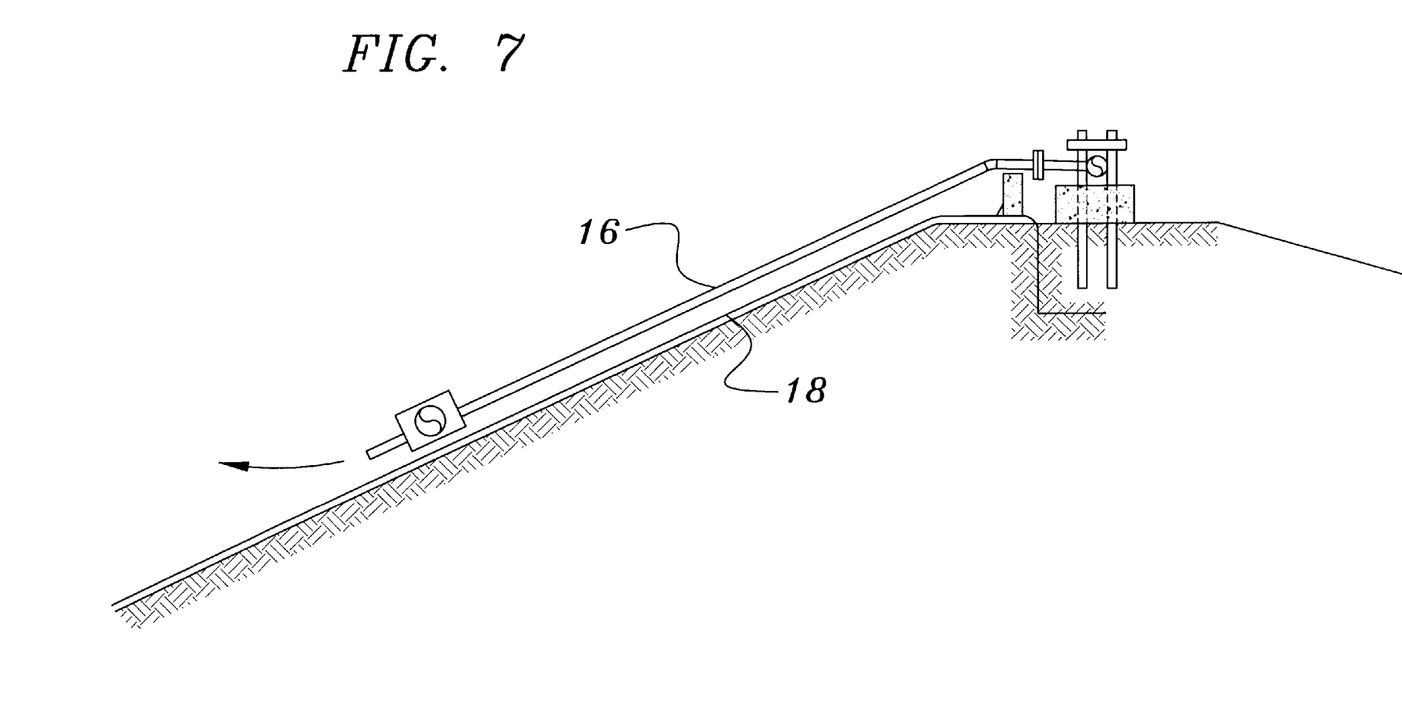
FIG. 7 is a sectional view of an aerator injector.

After it is mechanically screened and pressed, the wastewater is gravity feed through a conduit 12 into a primary treatment aerobic lagoon 10 where it undergoes aerobic digestion for a period of several days. The retention time is preferably less than a week and typically five days. The piping and conduits of the present invention are preferably schedule 80 PVC and range in size from 1 to 12 inches in diameter. The aerobic lagoon may be readily sized according to the quantity of wastewater to be treated. The aerobic lagoon illustrated in FIGS. 2–5 has a volume of approximately 500,000 gallons. Though an aerobic lagoon may be configured in a variety of shapes, preferably it is a rectangular structure having sloped sides. Soil and groundwater site constraints as well as the amount of surface area required to maximize oxygen diffusion dictate liquid depths and surface area. Construction of an appropriately sized and dimensioned aerobic lagoon is within the ability of one skilled in the art. Preferably, as illustrated in FIG. 7, the aerobic lagoon incorporates a synthetic or earthen liner 18 to prevent groundwater contamination.

Digestion of organic wastes by microorganisms provides a great deal of pollutant reduction. Two forms of microbial digestion are aerobic, with oxygen, and anaerobic, without oxygen. The present invention is designed to emphasize and enhance aerobic digestion within the primary lagoon versus typical anaerobic digestion for hog wastewater effluent treatment. Utilization of aerobic bacteria increases the rate of digestion and reduction of organic pollutants while eliminating the foul odors (methane, ammonia, hydrogen sulfide, etc.) without the addition of chemicals. Aerobic bacteria require free elemental (dissolved oxygen. Therefore, to maximize the introduction of oxygen and ensure the continual mixing of the wastewater within the lagoon a plurality of aerating means 14 are utilized. As illustrated in FIGS. 2–4, the plurality of aerating means are preferably installed at the periphery of the lagoon, however, the placement of the aerating means may be varied depending upon the size and configuration of the primary aerobic lagoon 10. It should be well understood that any number of aerating means might be configured depending upon the size of the aerobic lagoon. FIG. 7 illustrates a sectional view of an individual aerator 16 as oriented in relation to the edge of the aerobic lagoon and lagoon liner 18. The aerating means is supplied by means of a primary lagoon circulation/aeration system 19 that preferably incorporates at least a plurality of aeration pumps on a common distribution line to assure reciprocity. It is anticipated to introduce an excess amount of oxygen above the $BOD_5$ requirement, which will allow for nitrification to occur concurrently with the $BOD_5$ and organic nitrogen reductions once the system reaches steady state.

Large aeration pumps will be used to circulate the wastewater within the aerobic lagoon while injecting high concentrations of oxygen to support the aerobic bacteria. Based upon the total daily flow rate of approximately 100,000 gallons of waste per day, the hydraulic retention time is between three and seven days, preferably five days.

A specialized bacterium per se is not required for functioning of the present invention because aerobic species of bacteria occur naturally in animal waste. However, in a preferred embodiment of the present invention beneficial bacteria are isolated, purified and propagated so that the aerobic lagoon may be seeded with a "slug dose" of the cultured bacteria. The purpose of the slug dose is to provide the cultured bacteria selective dominance in the lagoon so it will not have to out-compete other bacteria species for the food and oxygen source thereby increasing digestion efficiency. It is well within the skill of one in the art to select and propagate appropriate beneficial aerobic bacteria for seeding the aerobic lagoon. Continual addition of specialized bacteria is necessary to maintain selective dominance within the lagoon to prevent any non-beneficial species from out-competing the desired aerobic bacteria. However, once the lagoon has stabilized, lower-dosing rates should be required in order to maintain the selective dominance. Preferably, prior to initiation of full fledge treatment of wastewater, beneficial bacteria undergo an activation and growth period within the aerobic lagoon.

As illustrated in FIG. 13, once wastewater had undergone aerobic digestion for a period of days, it is pumped through an uptake conduit 30 by means of a pump 32 for secondary treatment including solid separation and denitrification (which will be referred to collectively as clarification). The secondary treatment may occur in either an anoxic lagoon (not shown) or in a plurality of aboveground storage tanks 20. A target of $BOD_5$ of $\leq 100$ mg/L residual in the wastewater transferred from the aerobic lagoon to the secondary treatment is required to provide a sufficient carbon source for the denitrifying bacteria.

Flocculation and sedimentation of solids is a method of water clarification where the particles in the water will agglomerate either through natural attractions or through stimulation using processes such as polymer addition, ozonation, mixing, aeration and filtration. The aerobic sludge generated as a result will be fluffier, less dense and easier to handle and de-water than anaerobic sludge and the primary benefit is the lack of noxious odors. Sludge accumulation can be increased with the use of polymers for enhancing solids removal utilizing a much smaller area and less settling time versus natural gravity settling. Selective blended polymers are employed which will enhance the value of the resultant sludge by providing macro- or micro-nutrients such as calcium, magnesium, manganese, zinc or iron.

Figure 6:
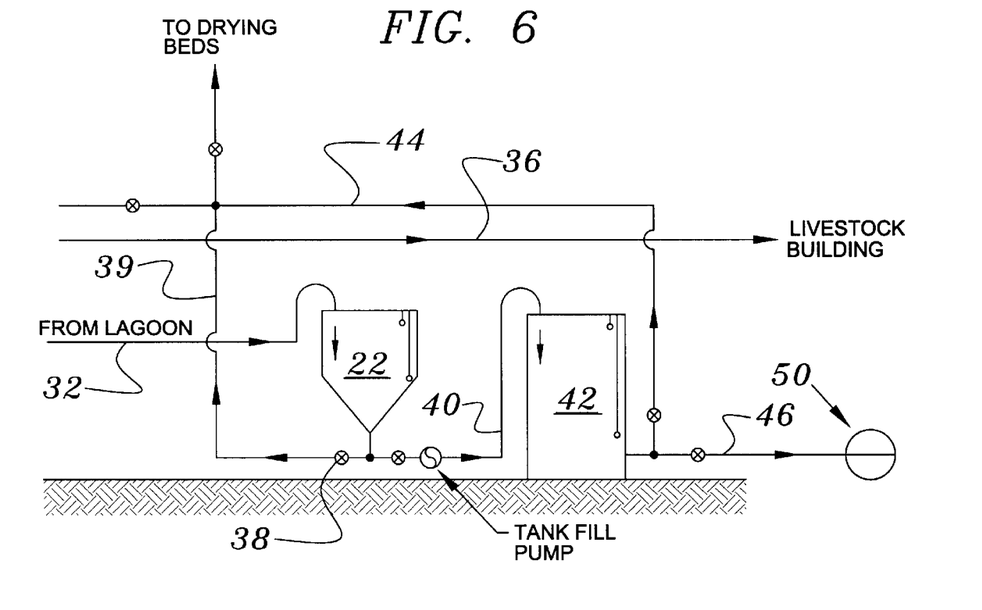
FIG. 6 is a flow diagram of wastewater transfer through the separation/denitrification phase of the purification system of the present invention.

Specifically, the wastewater from the primary aerobic lagoon first flows into a plurality of conical bottom settling tanks 22a and 22b for suspended solids precipitation. As illustrated in FIG. 6, the conical bottom portion of the conical bottom settling tanks 22 aids in precipitating suspended solids. Depending upon the size of the conical bottom settling tank(s), the wastewater will be retained therein for a period of several hours. Prior to entry into the conical bottom settling tank(s) the wastewater flows through a polymer feed system 53 whereby a polymer is added to the wastewater to precipitate and promote solids separation prior to further treatment for drinking and misting use. As necessary, a certain amount of the aerobically digested wastewater from the aerobic lagoon will be pumped to deluge tanks (not shown) located at livestock buildings by means of a deluge pump 34 and deluge conduit 36 prior to entry into the conical settling tanks for use as deluge water for periodic flushing of the sub-floor of the houses. As the deluge water passes through the space beneath the animal pens, this space acts as a trickle filter to aid in bacteria contact, aeration and growth activity of the aerobically digested wastewater from the aerobic lagoon.

The polymer is preferably an organic cationic polymer such as ADT Poly-Clear™, but any similar polymer or flocculant (including but not limited to Ferric sulfate, $Fe_2(SO_4)_3$) sold by chemical manufacturers under a variety of trademarks may be utilized. Use of the polymer reduces organic loading on the system and renders the wastewater clear of suspended solids prior to treatment within the plurality of flat bottom tanks or as an alternative an in-ground, lined reservoir.

Once the wastewater undergoes solid separation in the plurality of conical bottom settling tanks 22a and 22b and a sufficient volume of solids has accumulated in the bottom regions of the conical bottom settling tanks, a selective control valve 38 is opened and a portion of the precipitated solids/sludge is conveyed via a conduit 39 to a plurality of sludge drying beds 60.

The characteristics of aerobic sludge will differ from anaerobic sludge. Aerobic sludge will be a light colored, fluffy material with very little odor. Anaerobic sludge is a dark colored, thick and pasty material that smells like petroleum and/or any of the previously mentioned noxious gases depending on what is trapped within the pores of the sludge.

After the collected solids are directed to the drying beds, the control valve 38 may then be opened to permit the transfer of the liquid or supernatant via a pump 54 and conduit 40 to a plurality of aboveground tanks 42a, 42b, 42c and 42d for further denitrification and storage until needed.

In a preferred embodiment, a portion of the supernatant is transferred back to the aerobic lagoon 10 through a control valve 55 via a conduit 44 for bacteria reincorporation and further treatment. Additionally, ~10% of the activated sludge accumulated in the storage tanks during the settling period will remain within the tanks in order to provide an aged sludge to help ensure sufficient denitrification within the tanks.

Approximately 30% of the solids/sludge will be recycled from the secondary treatment area back to the aerobic lagoon for further breakdown with the remaining 70% being pumped to sludge drying beds for de-watering. The de-watered sludge will be relatively high in nutrients and once deactivated can be used for applications such as soil amendment, fertilizer or top-soil.

Figure 5:
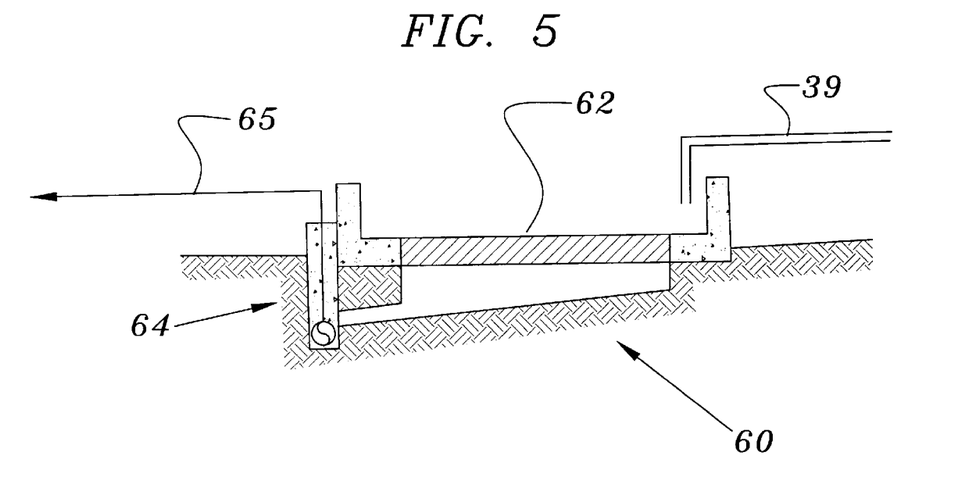
FIG. 5 is a sectional view of a drying bed according to the present invention.

Sludge drying beds 60 are used to receive wet solids for drying on a daily basis prior to deactivation and collection and for de-watering of suspended solids and aerobically digested sludge. As illustrated in FIG. 5, each of the plurality of drying beds 60 incorporates a filter media 62 will have an under drain collection area 64 where the liquid from the dewatered solids/sludge will be routed back into the aerobic lagoon via a sump pump and conduit 65 or via a gravity flow conduit. The drying beds are preferably graded from the influent end to the effluent end to facilitate gravity water drainage. Preferably, an underground drainage system comprising a layer of porous material such as sand and/or gravel is constructed under the drying bed(s) with catch basins and piping arranged to collect water for piping. Dried sludge will be deactivated and removed periodically from the site for use based upon the amount generated on a daily basis.

Wastewater which has undergone aerobic digestion and solids separation/denitrification is stored in a plurality of above-ground tanks 42 until needed for animal drinking and/or misting. By way of example, each finishing hog requires ~3.5 gallons per day for both drinking and misting with drinking water being provided twenty-four (24) hours per day based upon demand. Clarified water will be pumped from the storage tanks 42 through control valve 55 via a conduit 46 to a water purification system so which utilizes a series of filters and disinfection with ozone prior to the wastewater being suitable for use as drinking/misting water.

Filtration using sand and (granular activated carbon (GAC)) aid in the removal of organics and particulate matter in the form of turbidity and suspended solids from the wastewater stream. The processes involve the adsorption of particulate matter to the surfaces of the absorbent and ultimate removal from the water flow. The trapped solids can then be removed through rapid back-washing for cleaning and the media requires replacement when it is spent.

Ozone is a strong oxidant commonly used as a disinfectant in wastewater treatment. Ozonation involves providing an electric charge to oxygen ($O_2$) to form ozone ($O_3$). The ozone is introduced into a water column as small bubbles to maximize the ozone-water interface and drive the ozone into solution. The ozone releases one of the three unstable oxygen atoms, which attacks and oxidizes impurities in the water. Advantages of using ozone include organics oxidation, bacterial and viral deactivation, removal of unpleasant taste, color and odor removal, turbidity reduction and elimination of trihalomethane (THM, resulting from chlorination of humic substances) formation. The use of ozone as a water purification agent is known in the art and will not be described in detail herein.

In a preferred embodiment, contamination reduction for the drinking and misting water treatment system will be >99% for parameters such as $BOD_5$, COD, and suspended solids and 100% for microbial contaminants. By way of example, a target ORP for complete sterilization is $\geq 670$ mV or a sterile nitrate-nitrogen level of less than 40 ppm. After water is drawn from the plurality of aboveground denitrification/storage tanks 42 through control valve 55 via conduit 46 via a sand filter/ozonation pump 48, it passes through filtration by means of a plurality of sand filters 52. The sand filter(s) may be standard filter(s) whose construction is well known in the art and may be designed and sized on the basis of quantity and rate flow as well as the desired porosity and quality of the water to be treated.

Any commercially available ozone machine or system 56 including contact columns 58 may be used inline in association with the system of the present invention, provided it can attain target purification requirements. However, in a preferred embodiment, the ozone system utilized in an AJT TechoOzone® machine as disclosed and typified in U.S. Pat. No. 5,785,864 to Teran et al., the disclosure of which is incorporated herein in its entirety by reference. More specifically, in the present invention the ozone system preferably incorporates a plurality of contact columns 58 sized to ensure a minimum contact time of at least ten minutes for water within the columns. Each contact column is a longitudinally extending elongate hollow enclosure having a closed top-portion, a closed bottom portion, and a gas tight interior space therein. The required contact time and specific size of the contact columns may be readily ascertained by one skilled in the art. Utilizing the following calculations the ozone generator and water purification system can be readily sized for particular applications. First, the type and general characteristic of the water source (water quality, flow rate and gallons per minute) must be analyzed. Then the ozone dosage and contact time required are ascertained. Generally speaking, ozone generator size=flow rate (in gal/min)× 0.012% ozone dosage required (in mg/l) equals lbs./day.

Water that has undergone final carbon filtration 57 for residual organics removal and disinfection is then pumped from the post-ozonated water storage tank 66 via a conduit 70 to a drinking water aboveground storage tank (not shown) prior to consumption by the livestock.

As necessary, well water may be utilized to "make-up" water to replace what is lost through evaporation, drift (misters) and consumption in order to maintain a consistent quantity within the treatment system.

Preferably, the apparatus and method of the present invention may be monitored and controlled via a computerized control system, housed in a control house 100, that utilizes a programmable logic controller (PLC) which will incorporate use of in-line analytical instrumentation for remote access. The secondary treatment phase, water purification system and control houses are preferably disposed upon a geoweb mat 90 or other suitable base such as concrete.

In use, the system of the present invention results in no wastewater being discharged directly to surface water or groundwater. Additionally, unlike the prior art, the present system is a closed treatment system where all wastewater is reused within the facility and there is no land-spreading irrigation. The present system is also beneficial since it eliminates odors associated with typical anaerobic lagoons and minimizes potential for possible pollution of surface or groundwater as a result of lagoon leakage.

The present disclosure includes that contained in the appended claims, as well as that of the foregoing description. Although this invention has been described in its preferred form with a certain degree of particularity, it should be understood that the present disclosure of the preferred form has been made only by way of example and that numerous changes in the details of construction and the combination and arrangement of parts and method steps may be resorted to without departing from the spirit and scope of the invention.

Now that the invention has been described,
What is claimed is:

1. An apparatus for treatment of agricultural animal wastewater, said apparatus comprising in combination:
   an aerobic lagoon having at least one wastewater inlet and at least one wastewater outlet and a plurality of aerating means, wherein said aerobic lagoon further comprises propagated aerobic bacteria selected to aerobically digest animal wastewater;
   a contaminated wastewater source connected in fluid flow communication with said aerobic lagoon;
   a water clarification means comprising a plurality of above ground tanks in fluid flow communication with said aerobic lagoon wherein solid separation and denitrification occur in an anoxic environment, wherein said clarifying means further comprises a polymer feed system to precipitate and promote solids separation;
   a plurality of drying bed in fluid flow communication with said clarification means wherein said precipitated solids are routed for further drying ad removal;
   a water purification means disposed following said water clarification means whereby ozone may be introduced into the contaminated water flow to provide dieinfected water suitable for use by agricultural animals;
   whereby no wastewater is discharged or spray irrigated and water is recycled for use by agricultural animals.

2. The treatment apparatus as in claim 1, further comprising a mechanical screening means disposed between said contaminated wastewater source and said aerobic lagoon wherein bulk solids are removed from the wastewater prior to the wastewater flowing into said aerobic lagoon thereby reducing oxygen demand on the apparatus.

3. The treatment apparatus as in claim 2 further comprising a mechanical roll press disposed between said mechanical screening means and said aerobic lagoon whereby said bulk solids are de-watered and the resultant wastewater is directed to said aerobic lagoon.

4. A method for treatment of agricultural animal wastewater, which comprises the following sequential steps:
   screening wastewater influent to remove bulk solids;
   pressing said bulk solids to remove excess moisture and directing the removed moisture to an aerobic lagoon for treatment;
   aerobically treating said wastewater in an aerobic lagoon said aerobic lagoon further comprises propagated aerobic bacteria selected to aerobically digest animal wastewater;
   diverting a portion of said aerobically treated wastewater to deluge tanks for use in flushing livestock buildings;
   injecting said aerobically treated wastewater with a polymer blend prior to its entering a plurality of aboveground clarifying means;
   clarifying and denitrifying said wastewater in the plurality of above-ground tanks whereby suspended solids are precipitated and a portion thereof diverted to a plurality of drying beds for drying;
   returning a portion of clarified supernatant to the aerobic lagoon;
   filtering water flowing from the clarifying means prior to disinfecting with ozone;
   treatment of said clarified water with ozone to provide drinking water suitable for agricultural animals.

5. A method according to claim 4, wherein aerobically treated wastewater from the aerobic treatment lagoon is utilized to periodically flush livestock buildings thereby accelerating the digestion of organics within the livestock buildings.

6. A method of for treatment of agricultural animal wastewater comprising the steps of:
   analyzing the characteristics of the wastewater to be treated;
   establishing the water quality parameters for the water;
   sizing an aerobic lagoon according to the quantity of water to be treated;
   isolating and propagating beneficial aerobic bacteria such that a selective dominance of the beneficial aerobic bacteria may be established in said aerobic lagoon;
   screening wastewater influent to remove bulk solids;
   pressing said bulk solids to remove excess moisture and directing the removed moisture to the aerobic lagoon for treatment;

aerobically treating said wastewater in the aerobic lagoon said aerobic lagoon further comprises propagated aerobic bacteria selected to aerobically digest animal wastewater;

diverting a portion of said aerobically treated wastewater to deluge tanks for use in flushing livestock buildings;

injecting said aerobically treated wastewater with a polymer blend prior to its entering a plurality of above-ground clarifying means;

clarifying said wastewater in the plurality of above-ground tanks whereby suspended solids are precipitated and a portion thereof diverted to a plurality of drying beds for drying;

returning a portion of clarified supernatant to the aerobic lagoon;

filtering water flowing from the clarifying means prior to disinfecting with ozone;

treatment of said clarified water with ozone to provide drinking water suitable for agricultural animals and recycling said drinking water to said livestock buildings.

7. A method according to claim 6, wherein wastewater undergoes treatment in said aerobic lagoon for a period of three to seven days.

8. A method according to claim 6, wherein said $BOD_5$ residual of the wastewater transferred from the aerobic lagoon to said clarification means is $\leq 100$ mg/L.

* * * * *

UNITED STATES PATENT AND TRADEMARK OFFICE
CERTIFICATE OF CORRECTION

PATENT NO. : 6,039,874
DATED : March 21, 2000
INVENTOR(S) : Teran et al.

It is certified that error appears in the above-identified patent and that said Letters Patent is hereby corrected as shown below:

Column 1,
Line 49, delete "forth" and insert -- forty --.

Column 4,
Line 57, delete "were" and insert -- where --.,

Line 59, after "(dissolved" insert -- ) --.

Column 8,
Line 39, delete "13" and insert -- 3 --.

Column 10,
Line 20, delete "so" and insert -- 50 --.

Column 11,
Line 15, delete "%" and insert -- x --.

Column 12,
Line 6, delete "dieinfected" and insert -- disinfected --.

Column 13,
Line 10, after "clarifying" insert -- and denitrifying --.

Signed and Sealed this

Thirteenth Day of August, 2002

Attest:

JAMES E. ROGAN
Attesting Officer   Director of the United States Patent and Trademark Office